United States Patent [19]

Weingartner

[11] 4,231,516
[45] Nov. 4, 1980

[54] HEAT CONTROL SYSTEMS

[76] Inventor: Charles E. Weingartner, Rte. 6, Box 413, Shawnee, Okla. 74801

[21] Appl. No.: 880,970

[22] Filed: Feb. 24, 1978

[51] Int. Cl.³ .............................................. F24B 7/02
[52] U.S. Cl. ...................................... 237/51; 237/55; 126/121; 165/DIG. 2
[58] Field of Search ............. 237/51, 55; 165/DIG. 2; 126/121, 122

[56] References Cited

U.S. PATENT DOCUMENTS

| 2,277,381 | 3/1942 | Black | 126/121 X |
| 2,322,016 | 6/1943 | Hardeman | 126/121 X |
| 2,471,351 | 5/1949 | Russell | 126/121 X |
| 3,190,279 | 6/1965 | Davis | 126/121 X |
| 3,944,136 | 3/1976 | Huie | 237/55 |
| 3,999,535 | 12/1976 | Hall | 126/121 |
| 4,043,313 | 8/1977 | Sherman | 126/122 X |
| 4,049,194 | 9/1977 | Tice et al. | 126/122 X |

Primary Examiner—Albert J. Makay
Assistant Examiner—William E. Tapolcai, Jr.
Attorney, Agent, or Firm—Laney, Dougherty, Hessin & Beavers

[57] ABSTRACT

Apparatus for providing more efficient use of heating and/or cooling sources as used within a building structure, particularly residential type buildings. In essence, this system utilizes a wood-burning fireplace in coactive conjunction with a standard form of building heater system, gas, oil or the like, and it functions to provide an integrated system having greater efficiency, and therefore greater fuel conservation. The fireplace includes a plurality of heat exchange chambers through which ambient air is pulled by the central system blower for subsequent recirculation through the heat register or release vents and, as temperature controls will dictate, central system heat may or may not be additive therewith. More efficient cooling is effected in like manner by coaction of a cooling system with the fireplace plenum chambers to provide a continual source of cooled air for contributive use with the central cooling system.

11 Claims, 2 Drawing Figures

HEAT CONTROL SYSTEMS

BACKGROUND OF THE INVENTION

1. Field of the Invention

The invention relates generally to improvements in heating and cooling systems and, more particularly, but not by way of limitation, it relates to improved fireplace structure for effecting heat or cooling addition to the ambient circulatory air within a building.

2. Description of the Prior Art

The prior art includes numerous types of heat control aiding fireplace structures wherein effort is made to utilize heat normally escaping to the exterior for additional warmth within a building structure. Some illustrations of the earlier types of system are to be found in U.S. Pat. No. 2,186,539 in the name of Slayter et al. There are numerous other patents of the general type which illustrate various forms of plenum chamber in combination with a fireplace, and needless to say the activity in the patent art today is becoming more crowded due to the fuel conservation needs of the moment. The closest prior art to Applicant's system is believed to be U.S. Pat. No. 3,834,619 in the name of Glover. This patent teaches integration of a fireplace heat exchanger and forced air furnace; however, this system utilizes the existing cold-air return ducts as a bi-directional circulation source in combination with the fireplace heat exchanger.

SUMMARY OF THE INVENTION

The present invention contemplates an improved heating/cooling system for building interiors, particularly residential type buildings, wherein a heat exchanger located at an open fireplace functions to heat or cool air drawn from the ambient surroundings for recirculation through the existing central heating system. The central heating system may be controlled to exhaust air from the fireplace heat exchanger through the building supply system, or it can be ignited to add to and increase heated air exhausted therefrom depending upon the uniform heating requisites of the building containing the system. The particular form of heat exchanger provides for total envelopment of the hot or cold air source with extremely large surface area for heat absorption prior to entry to a circulation duct.

Therefore, it is an object of the present invention to provide a more efficient temperature control system for buildings of the type containing an open fireplace.

It is also an object of this invention to provide a system for uniform heating and cooling of a building interior that is conservative of fuel expenditure.

Finally, it is an object of the present invention to provide an all season temperature control system that utilizes an open fireplace in heat exchanging relationship to the central heating air circulatory system but yet reduces to an extreme minimum that amount of air which escapes through the chimney to the building exterior.

Other objects and advantages of the invention will be evident from the detailed description when read in conjunction with the accompanying drawings which illustrate the invention.

DETAILED DESCRIPTION OF THE INVENTION

Figure 1:
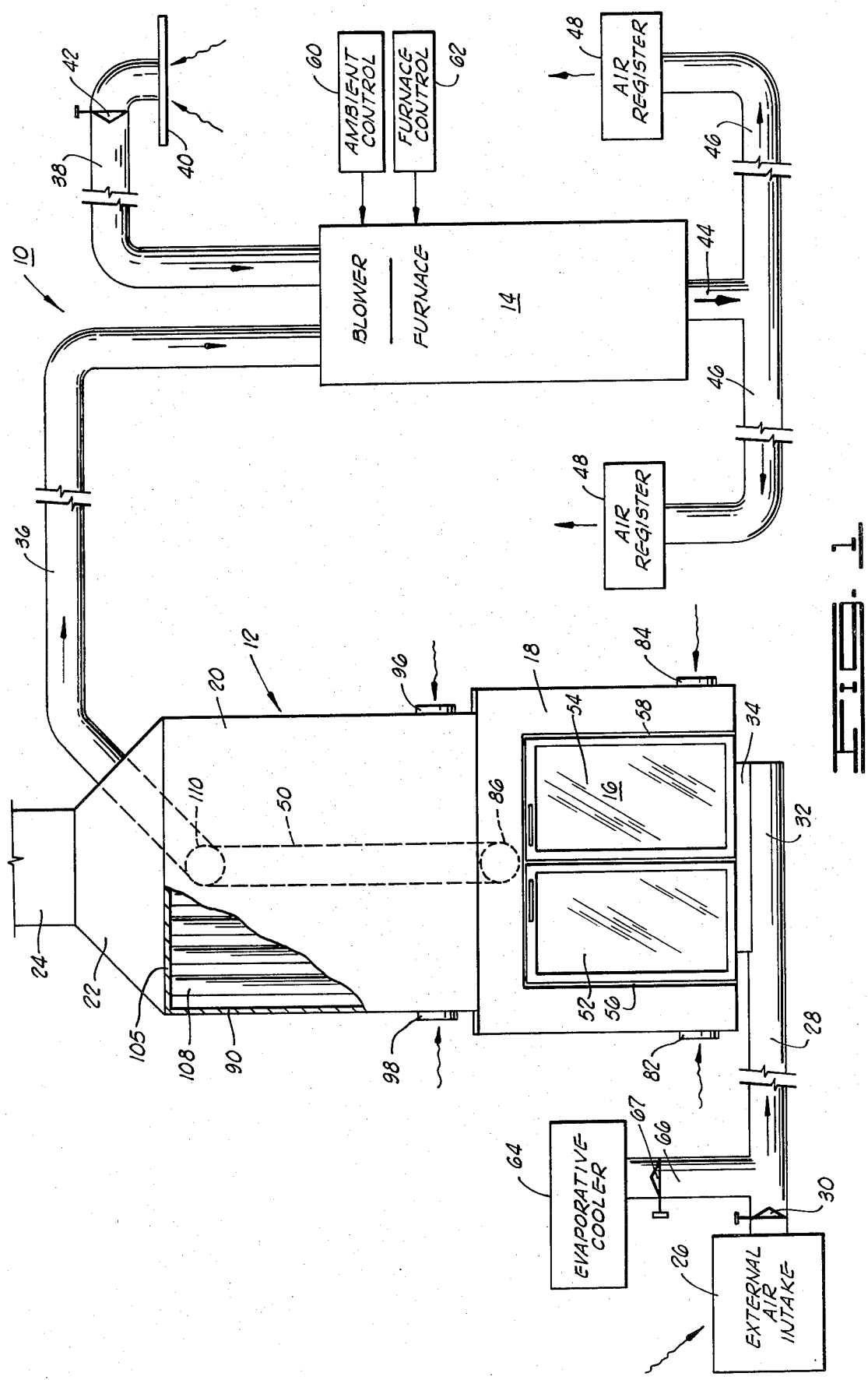
FIG. 1 is a layout depiction of the temperature control system.

Referring to FIG. 1, a heating system 10 consists of a fireplace 12 and central furnace assembly 14 as may be located in a building enclosure. The fireplace 12 consists of an open, fuel burning fireplace 16 as formed within a fire box lower chamber 18 supporting a flue chamber 20 thereabove. A manifold 22 is then secured on top of the chamber 20 to provide exit of smoke and gases via chimney structure 24. Combustion air is supplied from an external air intake 26 located outside of the building enclosure and the combustion air is input via conduit 28 as controlled by adjustable control flue 30 for release at conduit head 32 via air vent 34.

The central furnace 14 as located and mounted in conventional manner within the building enclosure may be any commercially available heat/cool furnace system of the type that includes an air moving blower. A circulation duct 36 leads from flue chamber 20 into the blower chamber of furnace 14, as does a cold air duct 38 leading from a cold air return vent 40 that is properly located within the building enclosure. An adjustable flue valve 42 functions to allow adjustment of the amount of cold air return proceeding via return duct 38 to the furnace 14. Air output from furnace 14, either auxiliary air or heated and applied in addition to auxiliary air, is via a conduit 44 and a plurality of conduits 46 disposed to distribute the conditioning air around the building enclosure or house to the various air registers 48 as properly located to enable uniform heating or cooling of the various rooms within the building enclosure.

A connecting duct 50 disposed at the rear of fireplace 12 serves to connect the lower chamber 18 with the flue chamber 20 as well as with circulation duct 36 leading to furnace 14. The front opening of the hearth or fireplace 16 is enclosed by double glass doors 52 and 54, e.g., thermal glass doors, which may be sidehinged in suitable manner to respective corners 56 and 58 of lower chamber 18. Thus, all combustion air for enabling air within fireplace 16 is drawn from the air vent 34 so that no inside air is drawn for eventual exhaust up the chimney 24.

The furnace 24 and the integral blower mechanism, e.g., a conventional squirrel cage air pressure device, may be controlled by what is designated as ambient control 60 and a furnace control 62. The controls 60 and 62 may be the conventional type of thermostatic control system such as the well-known Honeywell controllers; however, it is desirable to have control effected in two gradients as set by the thermostats, with ambient control 60 controlling within a first temperature range to operate the blower unit for movement of ambient air through the heat exchange chambers 18 and 20. The furnace control 62 is then adjusted to be effective at ranges outside of the ambient control range so that furnace heat can be switched into the cycle when necessary to maintain the desired room temperature.

An evaporative cooler 64 is connected to provide cool air input via conduit 66 as controlled by valve 67 for entry through conduit 28 to the fireplace 16. The evaporative cooler 64 may be the well-known type that is known as the "Swamp" cooler and it is preferably placed outside of the building unit for greatest effectiveness. However, a standard form of air conditioning unit could just as well be applied to provide cool air during the cooling season. In any event, the cool air input via conduit 66 and air vent 34 to fireplace 16 provides air exchange input to the lower chamber 18 and flue chamber 20 during the summer months.

Figure 2:
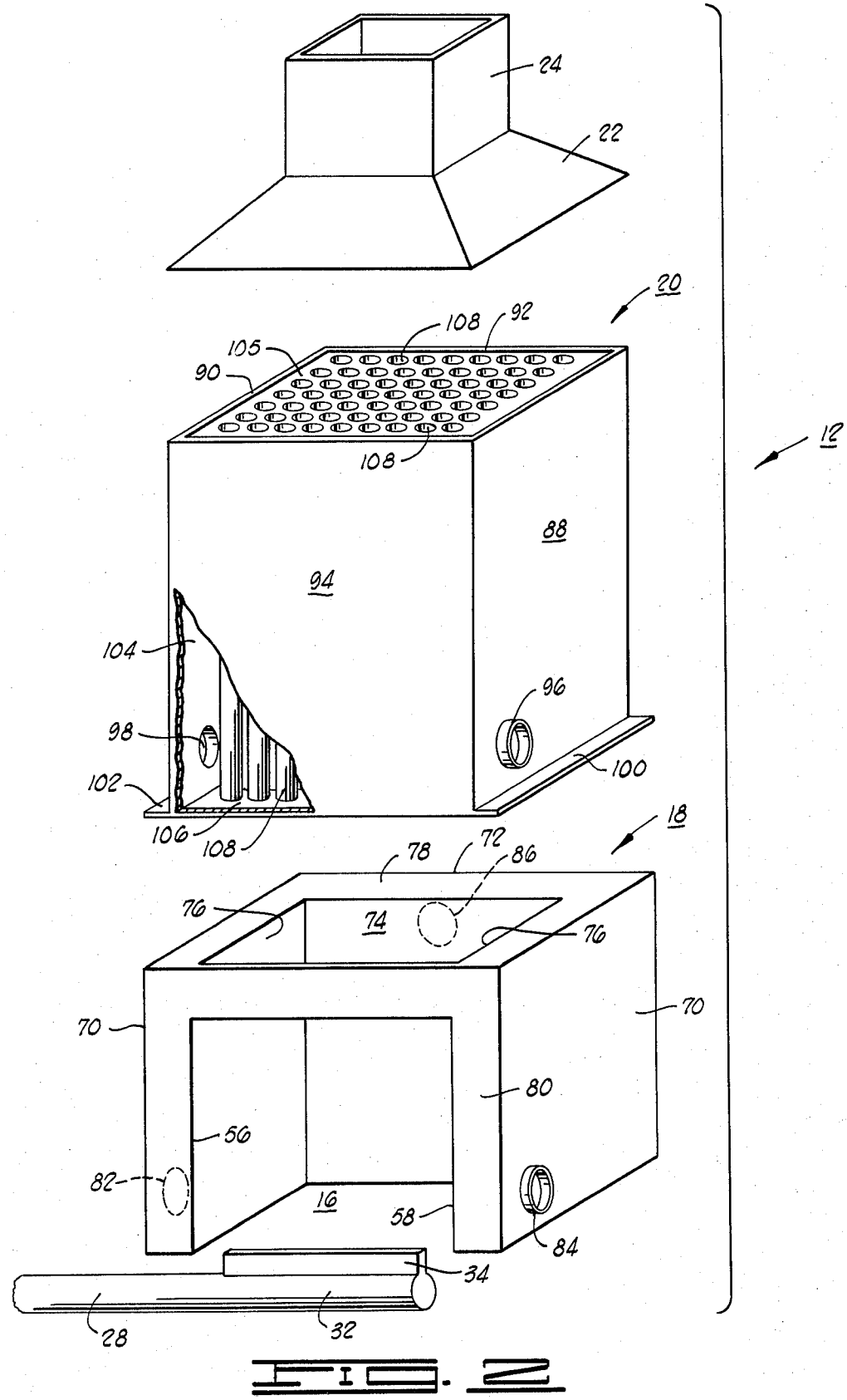
FIG. 2 is an exploded view in perspective of portions of the fireplace and heat exchanging structure as utilized in the system of FIG. 1.

Referring to FIG. 2, the fireplace 12 is shown in exploded form with each of the lower chamber 18, flue chamber 20 and manifold 22 illustrated in ascending order. The unit is of weld construction using heavy steel, e.g., quarter-inch steel plating, flue pipe and the like. The density and thickness of the material is a definite contributor to the effectiveness of the system as it directly relates to the amount of heat or cool retained as well as the rate of change under given heating or cooling effects.

The lower chamber 18 is formed as a generally U-shaped chamber as formed by outer side plates 70 and a rear plate 72, inner rear plate 74 and inner side plates 76 as well secured by a U-shaped top plate 78. The forward opening of the plate structure is then weld-secured closed by an inverted U-shaped plate 80. The bottom of the lower chamber 18 may also be plateenclosed if desired; however, this planar opening is normally placed in sealed, rigid affixure on the lower hearth structure of the selected fireplace design. Thus, the U-shaped lower chamber 18 is formed and intake vent holes 82 and 84 are placed at the forward lower corners of side plates 70 and a rear exhaust vent 86 (See FIG. 1) is formed in the upper central portion of rear panel 72.

The flue chamber 20 is of similar welded plate structure with side plates 88 and 90 joined by rear plate 92 and front plate 94. Side plates 88 and 90 are each formed with an air intake opening 96 and 98, respectively, as formed at the lower forward corners, and each of side plates 88 and 90 is formed with lower edge flanges 100 and 102 which serve for mating engagement with upper plate 78 of lower chamber 18 as by welding or the like.

An interior chamber 104 is then formed by weld-secured upper and lower matrix plates 105 and 106 with a plurality of flue pipes 108 joined therebetween in parallel arrangement. A vent opening 110 (see FIG. 1) is placed in the upper central portion of rear plate 92 for interconnection with circulation conduit 36. In present design, the flue chamber 20 includes nine rows by seven rows of flue pipes 108 for a total of sixty-three in parallel and each of these is weld-affixed about its end periphery to each of matrix plates 105 and 106, thereby defining and isolating the inner flue chamber 104 for circulation of ambient air therethrough with isolation of flue gases, soot and other fireplace debris.

The upper manifold 22 and the ascending chamber 24 are of similar metal construction, and are simply weld-secured down over the matrix plate 105. Where the fireplace 12 is installed on a designated underlying hearth structure, with conduit 28 and air vent 34 permanently disposed therein to release vented air within the fireplace opening of lower chamber 18, an outer covering of rock, brick or other fireplace trim, as desired, is placed therearound to enable the required decorative effects. In like manner, depending upon fireplace design, stone, insulation or other material is placed adjacent manifold 22 and the chimney structure 24 to provide the requisite fire safety characteristics.

In operation, a fire within fireplace 16 as may be provided by gas jet, cord wood and the like, receives combustion air from outside of the building enclosure at external air intake 26 as adjusted by flue valve 30 and input by air vent 34 into the fireplace behind the thermal doors 52 and 54. In other words, the fireplace is completely sealed from the surrounding outer room. Combustion gases from the fire within fireplace 16 then proceed upward through the plurality of flue pipes 108 for eventual exhaust through manifold 22 and chimney 24 to the exterior. Heat exchanger chamber 108 functions as a storage reservoir to retain much greater amounts of heat that would normally be lost. The number and size of flue pipes 108 is critical in that the number as shown provides a desired degree of baffling which tends to hold the generated fireplace heat within the lower chamber 18 thereby enabling a greater absorption of heat per unit time in both of lower chamber 18 and flue chamber 20. Thus, ambient room air is circulated into each of lower chamber 18 and flue chamber 20 through their respective intake vents 82, 84 and 96, 98 to be heated in its passage therethrough to the rear exhaust openings 86 and 110, respectively.

The heated ambient air is then circulated through openings 86 and 110 and circulation duct 36 to the furnace 14 whereupon the integral blower unit can move the air through conduit 44 and the various distribution conduits 46 to the air registers 48 throughout the building enclosure. While this heat may be sufficient during certain times, should the control thermostat require still greater heat to provide the desired room temperature, furnace 14 can be switched on to not only move the heated air from recirculation duct 36 but also to provide an additional heat source, with the combined heated air output proceeding through conduit 44. In this situation, the cold air register 40 and cold air duct 38 will provide air input to the heater chamber of furnace 14.

During warm weather periods, the heat exchange chambers and a source of cold air are utilized to provide ambient air cooling in much the same manner as the heating process. Thus, the external air intake flue valve 30 is closed to provide for periodic operation of the evaporative cooler 64 thereby to place wet, cold air through conduits 66, 28 and air vent 34 into the fireplace 16. This air then provides cooling of the inner chamber space of lower chamber 18 as well as chamber 104 of the flue chamber 20 so that room air circulated therethrough, as removed through vent openings 86 and 110 to circulation duct 36, provide a source of cool air to the furnace 14 blower unit for circulation through distribution conduits 46 to the air registers 48. The evaporative cooler 64 may be thermostatically controlled in a well-known manner and, it may also be used in conjunction with a standard air conditioning system in auxiliary manner. During use of the system in the cooling mode, it may be desirable to further baffle the plurality of flue pipes 108 by means of such as a sliding matrix plate adjacent the upper matrix plate 105 which serves to further restrict all of the exit holes from flue pipes 108.

The foregoing discloses a novel auxiliary heating and cooling system for use within a building structure wherein the open hearth or woodburning fireplace is utilized to provide heating of ambient room air and, in summer, the same structure may be utilized to provide some degree of cooling of the circulatory air within the building. The present system provides greater efficiency of usage of heat sources and the fuel contributors thereto so that the overall effect is one of greater economy and conservation of resources. While the system is designed primarily for residential building enclosures, it is by no means limited to such usage and may take on various forms as dictated by the exigencies of installation in buildings of particular design and construction.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. An auxiliary fuel burning temperature control apparatus for use in a building enclosure in combination with a central furnace and blower system, comprising:
   first chamber means having a front opening and defining a fireplace with a continuous volume of chamber around the rear and both sides, said chamber having air intake vents proximate the bottom of each side and an air exhaust vent proximate the top of the rear;
   means for enclosing said first chamber means front opening to close said fireplace;
   second chamber means of generally cubical form for secure affixure on top of said first chamber means, said second chamber means including a plurality of rows of flue pipes extending vertically therethrough and into communication with said fireplace, said second chamber means including lower lateral air intake vents and upper exhaust vent;
   manifold and chimney means securely affixed over the top of said second chamber means;
   means for introducing air into said first chamber means fireplace from external to said building enclosure; and
   duct means for conveying conditioned air from said upper exhaust vents of each of the first and second chamber means to said central furnace and blower system for distribution within said building enclosure.

2. An apparatus as set forth in claim 1 wherein said means for introducing comprises:
   external air intake means for supplying combustion air into said fireplace.

3. An apparatus as set forth in claim 1 wherein said means for introducing comprises:
   air cooling means providing cold air output for supply into said fireplace.

4. An apparatus as set forth in claim 1 wherein said first chamber means is formed from heavy gauge plate steel.

5. An apparatus as set forth in claim 1 wherein said second chamber means further comprises:
   front, rear and opposite side panel means defining the outer periphery;
   upper and lower matrix panel means secured over the upper and lower periphery of said front, rear and opposite side panel means, said matrix panel means each having a plurality of holes formed therein in identical spacing and arrangement; and
   a plurality of pipes secured between said matrix panel means, each pipe being affixed at each end within a hole of like spacing and arrangement.

6. An apparatus as set forth in claim 5 wherein said means for introducing comprises:
   external air intake means for supplying combustion air into said fireplace.

7. An apparatus as set forth in claim 5 wherein said means for introducing comprises:
   air cooling means providing cold air output for supply into said fireplace.

8. An apparatus as set forth in claim 5 wherein said second chamber means is formed from heavy gauge steel.

9. An apparatus as set forth in claim 1 wherein said means for introducing comprises:
   air duct means extending from the enclosure exterior to said fireplace;
   external air vent means supplying combustion air to said air duct means;
   evaporative cooler means supplying cold air output to said air duct means; and
   means for controlling alternatively the supply of external combustion air and cold air to enable respective heating and cooling functions to said apparatus.

10. An apparatus as set forth in claim 9 wherein said first and second chamber means are each formed from heavy gauge steel.

11. An apparatus as set forth in claim 10 wherein there are a plurality greater than sixty of said flue pipes.

* * * * *